(12) United States Patent
Ishihara et al.

(10) Patent No.: US 10,392,477 B2
(45) Date of Patent: Aug. 27, 2019

(54) METHOD FOR MANUFACTURING COAGULATED PARTICLES FROM LATEX PREPARED BY EMULSION POLYMERIZATION, AGGREGATES FROM LATEX PREPARED BY EMULSION POLYMERIZATION, AND COAGULATED PARTICLES FROM LATEX PREPARED BY EMULSION POLYMERIZATION

(71) Applicant: KANEKA CORPORATION, Osaka-shi (JP)

(72) Inventors: Morio Ishihara, Takasago (JP); Takashi Ueda, Takasago (JP); Ryohei Ishimaru, Takasago (JP); Satoshi Kishi, Takasago (JP)

(73) Assignee: KANEKA CORPORATION, Osaka-shi (JP)

( * ) Notice: Subject to any disclaimer, the term of this patent is extended or adjusted under 35 U.S.C. 154(b) by 394 days.

(21) Appl. No.: 15/128,170

(22) PCT Filed: Mar. 6, 2015

(86) PCT No.: PCT/JP2015/056728
§ 371 (c)(1),
(2) Date: Sep. 22, 2016

(87) PCT Pub. No.: WO2015/146549
PCT Pub. Date: Oct. 1, 2015

(65) Prior Publication Data
US 2017/0101514 A1    Apr. 13, 2017

(30) Foreign Application Priority Data

Mar. 26, 2014 (JP) .................................. 2014-064265
May 28, 2014 (JP) .................................. 2014-110592

(51) Int. Cl.
*B01J 2/06* (2006.01)
*C08C 1/14* (2006.01)
(Continued)

(52) U.S. Cl.
CPC . *C08J 3/16* (2013.01); *B01J 2/06* (2013.01); *C08C 1/14* (2013.01); *C08F 279/02* (2013.01); *C08J 2351/04* (2013.01)

(58) Field of Classification Search
None
See application file for complete search history.

(56) References Cited

U.S. PATENT DOCUMENTS 4,302,377 A   11/1981   Gurak et al.
4,429,114 A   1/1984    Sugimori et al.
(Continued)

FOREIGN PATENT DOCUMENTS

EP   0 066 104 A2   12/1982
EP   1 739 102 A1   1/2007
(Continued)

OTHER PUBLICATIONS

Extended European Search Report dated Oct. 27, 2017 in Patent Application No. 15769770.7, 7 pages.
(Continued)

*Primary Examiner* — Mary Lynn F Theisen
(74) *Attorney, Agent, or Firm* — Oblon, McClelland, Maier & Neustadt, L.L.P.

(57) ABSTRACT

The present invention relates to a method for manufacturing coagulated particles from a latex prepared by emulsion polymerization, containing step of discharging the latex prepared by emulsion polymerization containing a thickener or the latex prepared by emulsion polymerization having a given viscosity into a solution containing a coagulating agent, to coagulate the latex prepared by emulsion polym-
(Continued)

erization, aggregates having an anisotropy shape obtained by discharging a latex prepared by emulsion polymerization containing a thickener into a solution containing a coagulating agent, and coagulated particles from the latex prepared by emulsion polymerization obtained by the method.

21 Claims, 2 Drawing Sheets

(51) Int. Cl.
 *C08J 3/16* (2006.01)
 *C08F 279/02* (2006.01)

(56) References Cited

U.S. PATENT DOCUMENTS

| | | | |
|---|---|---|---|
| 4,491,658 A | 1/1985 | Sugimori et al. | |
| 4,897,462 A | 1/1990 | Yusa et al. | |
| 6,114,415 A * | 9/2000 | Bertelo | B01J 14/00 366/182.1 |
| 6,699,964 B1 | 3/2004 | Toritani et al. | |
| 2007/0219294 A1 | 9/2007 | Ueda | |
| 2007/0270539 A1 | 11/2007 | Yui et al. | |
| 2008/0108750 A1 | 5/2008 | Terada et al. | |
| 2008/0139697 A1 | 6/2008 | Ueda | |
| 2008/0146687 A1 | 6/2008 | Ueda | |
| 2008/0167402 A1 * | 7/2008 | Ueda | C08J 3/16 523/352 |
| 2008/0176974 A1 | 7/2008 | Ueda | |
| 2009/0124778 A1 * | 5/2009 | Ueda | C08F 6/22 526/329.1 |

FOREIGN PATENT DOCUMENTS

| | | |
|---|---|---|
| EP | 1 834 988 A1 | 9/2007 |
| EP | 1 834 991 A1 | 9/2007 |
| EP | 1 840 154 A1 | 10/2007 |
| EP | 1 857 491 A1 | 11/2007 |
| JP | 52-68285 A | 6/1977 |
| JP | 56-18623 A | 2/1981 |
| JP | 57-187322 A | 11/1982 |
| JP | 58-80328 A | 5/1983 |
| JP | 59-84922 A | 5/1984 |
| JP | 59-199704 A | 11/1984 |
| JP | 60-217224 A | 10/1985 |
| JP | 4-258618 A | 9/1992 |
| JP | 6-234864 A | 8/1994 |
| WO | 01/16196 A1 | 3/2001 |
| WO | 2005/085299 A1 | 9/2005 |
| WO | 2006/092898 A1 | 9/2006 |

OTHER PUBLICATIONS

International Search Report dated Jun. 9, 2015 in PCT/JP2015/056728 filed Mar. 6, 2015.

* cited by examiner

[Fig.1]
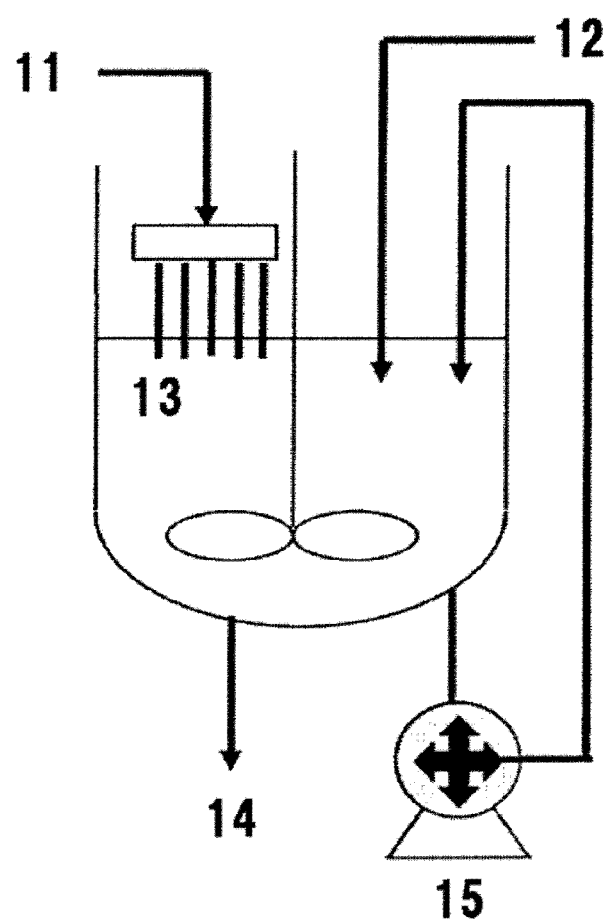

[Fig.2]
PRIOR ART
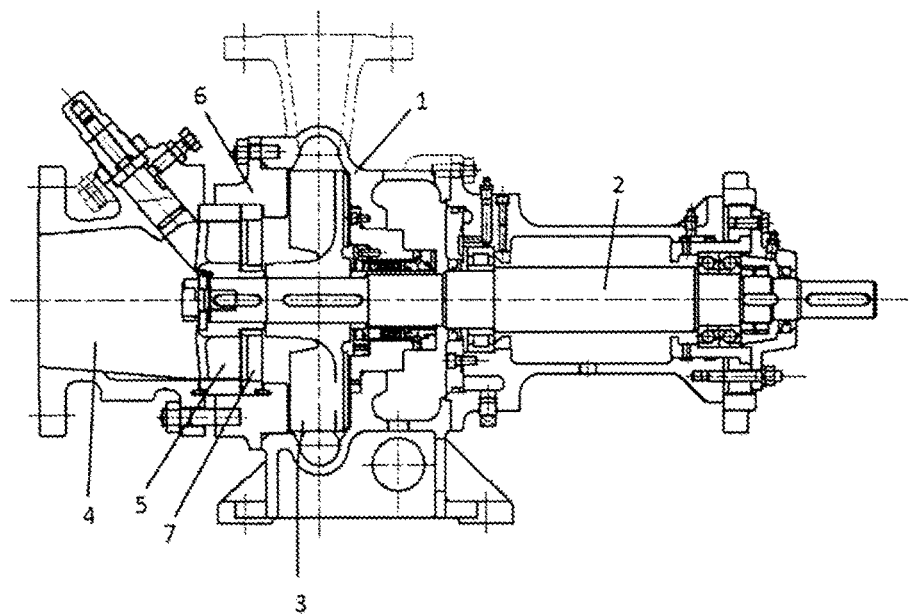

METHOD FOR MANUFACTURING COAGULATED PARTICLES FROM LATEX PREPARED BY EMULSION POLYMERIZATION, AGGREGATES FROM LATEX PREPARED BY EMULSION POLYMERIZATION, AND COAGULATED PARTICLES FROM LATEX PREPARED BY EMULSION POLYMERIZATION

TECHNICAL FIELD

The present invention relates to a method for manufacturing coagulated particles from a latex prepared by emulsion polymerization, aggregates from the latex prepared by emulsion polymerization, and coagulated particles (coagulated polymer particles) from the latex prepared by emulsion polymerization.

Further, in detail, the present invention relates to a method for manufacturing the coagulated polymer particles from the latex prepared by emulsion polymerization, aggregates from the latex prepared by emulsion polymerization, and coagulated particles from the latex prepared by emulsion polymerization, in which the coagulated particles have small contents of coarse particle size and fine particle size, and a high bulk specific gravity, and a volume average particle size of 50 to 500 μm.

BACKGROUND ART

Granulating processes, which coagulate polymer-containing latices and then recover the resultant coagulum, are usually required in order to recover desired graft copolymers from polymer-containing latices prepared by emulsion polymerization. In the granulating processes, it is required that aggregates having the powder properties such as particle size distribution, fine particle content, and coarse particle content are stably produced in a large amount. If the aggregates having excellent powder properties can be obtained, troubles such as clogging in line resulting from the aggregates can be prevented.

Here, problems in the conventional methods for manufacturing coagulated particles from a latex prepared by emulsion polymerization are explained. In conventional methods, a graft copolymer is recovered in the form of powder particles from a polymer latex prepared by the emulsion polymerization by the following procedure: Water is added to the latex to adjust a polymer solid content to 10% by weight or less, and then a coagulant is added to the resulting mixture at a temperature sufficiently lower than the softening temperature of the polymer to form coagulated polymer particles. Next, the resulting mixture is heated to at least the softening temperature of the polymer to produce a slurry, followed by dehydrating and drying. However, this process has the following problems: Since the powdered polymer particles have no regular shape and contains a large amount of fine powder, troubles frequently occur during the process or a working environment becomes worse because of dust generation. Further, there is a problem that a bulk specific gravity of coagulated particles is decreased.

Therefore, various improved granulating processes such as a method for coagulating the latex containing the polymer in gas-phase, a method for coagulating the latex containing the polymer in liquid-phase using an organic solvent (for example, see Patent Document 1), a method for softly coagulating the latex containing the polymer in liquid-phase (for example, see Patent Document 2), and a method for crushing coagulated particles in liquid-phase have been developed.

For example, in the method for coagulating the latex containing the polymer in gas-phase, there is a problem that the particle size of the resultant coagulated particles is uneven, and the fine particle content increases, since the latex prepared by emulsion polymerization is dropped from the gas-phase, and a solution containing a coagulating agent is sprayed to the latex, to coagulate the latex.

Patent Document 1 discloses a technique that polymerized particles like spherical shape are prepared by adding a latex prepared by emulsion polymerization to a medium containing an organic solvent under the stirring. However, in the technique of Patent Document 1, there is a problem that powder properties of coagulated particles are unsatisfactory and effects are provided on environment in some cases due to the remaining of the organic solvent in the polymerized particles (for example, core elastic part).

Patent Document 2 discloses a technique for manufacturing coagulated particles like spherical shape containing steps of contacting a latex prepared by emulsion polymerization with a solution containing a coagulating agent under stirring, to subject the latex to soft coagulation, and of further coagulating the softly coagulated latex with a solution containing a coagulating agent. However, in the technique of Patent Document 2, there is a problem that it is necessary to find an appropriate combination of two kinds of solutions containing a coagulating agent such that the differences of the physical properties of coagulated particles can be produced, that is, the coarse particle content increases in the case of decreasing the fine particle content even if the particle diameter is controlled by adjusting pH, the concentration of the solution containing a coagulating agent at the time of coagulation. In addition, there is a problem that water content is high and coagulated particles having a desirable properties can be hardly obtained even if the coagulated particles are subjected to dehydration step.

Patent Document 3 discloses a technique for manufacturing graft polymer particles containing step of discharging a polymerized latex from a given nozzle to contact the latex with a solution containing a coagulating agent. However, in the technique of Patent Document 3, there is a problem of the increase of the fine particle content, and the decrease of a bulk specific gravity, since the viscosity of the polymerization latex becomes lower, and softly coagulated particles having high void are formed due to the incorporation of water into the latex.

In spite of such intensive efforts, such processes are unsatisfactory even now with respect to productivity, powder properties, and facility costs; hence, the development of new granulating processes has been desired.

Further, in order to improve these problems, a method for using the coagulating agent of the polymer is proposed as a new method for granulating the latex containing the polymer (for example, Patent Document 4). The method granulates the latex prepared by emulsion polymerization by adding an anionic polyacrylamide as the coagulating agent of the polymer and the inorganic salt to the latex prepared by emulsion polymerization.

However, in the technique of Patent Document 4, when the solid content of the latex prepared by emulsion polymerization is more than 10% by weight, the latex is not stirred with the coagulating agent, and the appropriate coagulated particles cannot be obtained. Therefore, in order to obtain the appropriate coagulated particles, it is necessary that the solid content is adjusted to 10% by weight or less by diluting the latex prepared by emulsion polymerization with a large amount of water, so that the burden for draining waste water becomes much. In addition, the granulating operation cannot be carried out at only higher temperature of 80° C. regardless of the nature of the latex prepared by emulsion polymerization, so that the technique is not satisfactory in the view of the consumption of large energy.

Further, in the case of using the coagulating agent of the polymer in Patent Document 4, there is a problem of the decrease of the fine particle content having 60 mesh or less (sieve opening of 250 μm or less), and the increase of the coarse particle content having 4 to 20 mesh (sieve opening of 4.75 mm to 0.85 mm).

PRIOR ART DOCUMENTS

Patent Document

Patent Document 1: JP 52-68285
Patent Document 2: JP 60-217224
Patent Document 3: WO01/016196
Patent Document 4: JP 59-84922

SUMMARY OF THE INVENTION

Problems to be Solved by the Invention

To solve the above-described problems, it is an object of the present invention to provide a new method for manufacturing coagulated particles from a latex prepared by emulsion polymerization having excellent powder properties such as smaller fine particle content having 50 μm or less of the volume average particle size, smaller coarse particle content having more than 1000 μm of the volume average particle size, a high bulk specific gravity than those obtained by conventional methods such as salting out, and having excellent productivity such that the latex prepared by emulsion polymerization having the solid content of 10% by weight or more can be handled. In addition, the object of the present invention is to provide aggregates from the latex prepared by emulsion polymerization, and coagulated particles from the latex prepared by emulsion polymerization.

Solutions to the Problems

In order to solve the above problems, the present inventors have found that coagulated particles from the latex prepared by emulsion polymerization can be efficiently prepared with desirable properties by discharging the latex prepared by emulsion polymerization containing a thickener (preferably a water-soluble polymer) from the nozzle (for example, dipping nozzle), contacting the latex with a solution containing a coagulating agent to obtain aggregates having the anisotropic shape (preferably, a long shape, a bundle shape, a strand shape, a string shape, and the like), crushing the aggregates, and heating a slurry solution obtained by crushing of the aggregates, to complete the present invention.

Concretely, the present invention is as follows:
1) A method for manufacturing coagulated particles from a latex prepared by emulsion polymerization, containing step of discharging the latex prepared by emulsion polymerization containing a thickener into a solution containing a coagulating agent, to coagulate the latex prepared by emulsion polymerization.

2) The method according to 1), wherein the latex prepared by emulsion polymerization has a viscosity of 10 mPa·s or more at 25° C.
3) A method for manufacturing coagulated particles from a latex prepared by emulsion polymerization, containing step of discharging the latex prepared by emulsion polymerization having a viscosity of 10 mPa·s or more at 25° C. into a solution containing a coagulating agent, to coagulate the latex prepared by emulsion polymerization.
4) The method according to any one of 1) to 3), wherein the thickener is contained in an amount of from 0.01 to 3.0 parts by weight, per 100 parts by weight of a polymer solid content of the latex prepared by emulsion polymerization.
5) The method according to any one of 1) to 4), wherein the latex prepared by emulsion polymerization is discharged from a nozzle into the solution containing a coagulating agent, and a nozzle outlet of the nozzle has the length of 2 mm or less from an inner circumference to a center part in cross sections thereof.
6) The method according to 5), wherein the nozzle is a circular tube having an inner diameter of from 1 mm to 4 mm at a nozzle outlet, or a nozzle having a flat nozzle outlet with a longer diameter of from 4 mm to 300 mm and a shorter diameter of from 1 mm to 4 mm.
7) The method according to 5) or 6), wherein the latex prepared by emulsion polymerization discharged from the nozzle is moved far away from the nozzle outlet to coagulate the latex in the solution containing a coagulating agent.
8) The method according to any one of 5) to 7), further containing step of making a flow in the solution containing a coagulating agent, and coagulating the latex prepared by emulsion polymerization in the solution containing a coagulating agent, to prepare the coagulated particles in the anisotropic shape, under conditions that the nozzle outlet for discharging the latex prepared by emulsion polymerization is directed to a direction in the range of ±90° relative to a direction of the flow, and the latex prepared by emulsion polymerization is discharged from the nozzle outlet at a linear velocity of 0.3 to 2 m/s.
9) The method according to any one of 1) to 8), wherein a polymer in the latex prepared by emulsion polymerization has a volume average particle diameter of from 0.05 to 0.5 μm.
10) The method according to any one of 1) to 9), wherein the latex prepared by emulsion polymerization has a polymer solid content of 10 to 40% by weight.
11) The method according to any one of 1), 2), and 4) to 10), wherein the thickener has a viscous average molecular weight of from 600,000 to 8,000,000.
12) The method according to any one of 1) to 11), wherein the coagulating agent is one or more substances selected from the group consisting of a monovalent inorganic acid, a salt of a monovalent inorganic acid, a divalent inorganic acid, a salt of a divalent inorganic acid, a trivalent inorganic acid, and a salt of a trivalent inorganic salt.
13) The method according to any one of 1), 2), and 4) to 12), wherein the thickener is one or more compounds selected from the group consisting of polyalkylene oxide, polyvinyl alcohol, methyl cellulose, hydroxyethyl methylcellulose, hydroxylethyl cellulose, hydroxylpropyl methylcellulose, sodium polyacrylate, polyvinyl pyrrolidone, polyacrylamide, and polydimethylaminoethyl methacrylate.
14) The method according to any one of 1) to 13), wherein the latex prepared by emulsion polymerization is obtained by polymerizing 50 to 100% by weight of butadiene, 0 to 40% by weight of an aromatic vinyl monomer, 0 to 10% by weight of a vinyl monomer copolymerizable with butadiene and the aromatic vinyl monomer, and 0 to 5% by weight of a multifunctional monomer to form a rubber latex having the glass transition temperature of 0° C. or less, and then graft-polymerizing 50 to 95 parts by weight of solid content of the rubber latex with 5 to 50 parts by weight of a monomer mixture containing 10 to 100% by weight of a methacrylic acid ester, 0 to 90% by weight of an aromatic vinyl monomer, 0 to 25% by weight of a vinyl cyanide monomer, and 0 to 20% by weight of a vinyl monomer copolymerizable with the methacrylic acid ester, the aromatic vinyl monomer and the vinyl cyanide monomer.

15) Aggregates having an anisotropy shape obtained by discharging a latex prepared by emulsion polymerization containing a thickener into a solution containing a coagulating agent.

16) The aggregates according to 15), wherein the aggregates have the average size of 0.01 to 100 cm$^3$.

17) A method for manufacturing coagulated particles from a latex prepared by emulsion polymerization, containing steps of crushing aggregates in the solution containing a coagulating agent obtained by the method according to any one of 1) to 14), and maintaining a resultant mixture at 60 to 100° C. for 1 to 60 minutes to obtain the coagulated particles.

18) Coagulated particles from a latex prepared by emulsion polymerization obtained by the method according to 17), wherein the coagulated particles have a bulk specific gravity of 0.35 g/cm$^3$ or more, a volume cumulative frequency of particles of 50 μm or less being 10% or less, and a volume cumulative frequency of particles of more than 1000 μm being 2.0% or less in the distribution of a volume particle diameter.

Effects of the Invention

According to the method for manufacturing coagulated particles from the latex prepared by emulsion polymerization of the present invention, the coagulated particles from the latex prepared by emulsion polymerization having small contents of fine particles having a volume average particle size of 50 μm or less and coarse particles having a volume average particle size of more than 1000 μm, a high bulk specific gravity can be efficiently prepared, compared with conventional granulating processes such as salting-out techniques. In addition, in the method for preparing the coagulated particles, there is no need to always use an organic solvent, and the coagulated particles can be stably produced in a large amount with a relatively simple equipment. Further, the coagulated particles from the latex prepared by emulsion polymerization obtained by the method of the present invention have a preferred powder property as a modifier (especially, impact modifier) for vinyl chloride resin and the like.

BRIEF DESCRIPTION OF DRAWINGS

FIG. 1 is a schematic drawing showing one example of the method for manufacturing the coagulated particles of the present invention. Index 11 indicates a latex containing polyethylene oxide; index 12 indicates a coagulation agent index 13 indicates a dipping nozzle; index 14 indicates a putting-out opening; index 15 indicates a crushing pump.

FIG. 2 is a schematic drawing from side and cross section view showing a crushing pump for obtaining the coagulated particles of the latex prepared by emulsion polymerization of the present invention.

DESCRIPTION OF EMBODIMENTS

The present invention is a method for manufacturing coagulated particles from a latex prepared by emulsion polymerization including step of discharging a latex prepared by emulsion polymerization containing a thickener or a latex prepared by emulsion polymerization having a given viscosity, into a solution containing a coagulating agent, to coagulate the latex. The method can prepare coagulated particles from the latex prepared by emulsion polymerization having the small contents of fine particles and coarse particles, and a high bulk specific gravity, by discharging into the solution containing a coagulating agent a latex prepared by emulsion polymerization having a higher viscosity than a conventional viscosity, and crushing the resultant aggregates.

In the present invention, the latex prepared by emulsion polymerization may be a solution for polymerization and reaction for preparing a core-shell graft copolymer by emulsion polymerization, or may be a solution in which a thickener is added to the solution for polymerization and reaction.

The features of the present invention are in that (1) the thickener is added to the latex prepared by emulsion polymerization or the viscosity of the latex prepared by emulsion polymerization increases, (2) the latex prepared by emulsion polymerization is discharged from a given nozzle to coagulate the latex into the solution containing a coagulating agent, and (3) the aggregates from the latex prepared by emulsion polymerization are crushed to control the particles size of the coagulated particles from the latex prepared by emulsion polymerization (particularly, the coarse particle size of more than 1000 μm).

In the present invention, coagulated particles (polymer particles) from a latex prepared by emulsion polymerization are not particularly limited. Any ones of those prepared by the following procedures are preferably employed for the reason mentioned below: (1) a polymer latex prepared by polymerization of 50 to 100% by weight of butadiene, 0 to 40% by weight of an aromatic vinyl monomer, 0 to 10% by weight of a vinyl monomer copolymerizable with butadiene and the aromatic vinyl monomer, and 0 to 5% by weight of a multi-functional monomer to form a rubber latex having a glass transition temperature of 0° C. or less, and then graft polymerization of 50 to 95 parts by weight, on a solid basis, of the rubber latex with 5 to 50 parts by weight of a monomer mixture containing 10 to 100% by weight of a methacrylic acid ester, 0 to 90% by weight of an aromatic vinyl monomer, 0 to 25% by weight of a vinyl cyanide monomer, and 0 to 20% by weight of a vinyl monomer copolymerizable with the methacrylic acid ester, the aromatic vinyl monomer, and the vinyl cyanide monomer; (2) a polymer latex prepared by polymerization of 50 to 100% by weight of acrylic acid ester, 0 to 40% by weight of an aromatic vinyl monomer, 0 to 10% by weight of a vinyl monomer copolymerizable with the acrylic acid ester and the aromatic vinyl monomer, and 0 to 5% by weight of a multi-functional monomer to form a rubber latex having a glass transition temperature of 0° C. or less, and then graft polymerization of 50 to 95 parts by weight, on a solid basis, of the rubber latex with 5 to 50 parts by weight of a monomer mixture containing 10 to 100% by weight of a methacrylic acid ester, 0 to 90% by weight of an aromatic vinyl monomer, 0 to 25% by weight of a vinyl cyanide monomer, and 0 to 20% by weight of a vinyl monomer copolymerizable with the methacrylic acid ester, the aromatic vinyl monomer, and the vinyl cyanide monomer; or (3) a polymer latex prepared by emulsion polymerization of 60 to 95 parts by weight of a mixture containing 50 to 95% by weight of methyl methacrylate, 5 to 50% by weight of a methacrylic acid ester containing an alkyl group having 2 to 8 carbon atoms, and 0 to 20% by weight of a vinyl monomer copolymerizable with the methyl methacrylate and the methacrylic acid ester, and then by polymerization of, in the presence of the resulting polymer latex, 5 to 40 parts by weight of a mixture containing 20 to 80% by weight of methyl methacrylate, 20 to 80% by weight of at least one monomer selected from acrylate esters and methacrylate esters other than methyl methacrylate, and 0 to 20% by weight of a vinyl monomer copolymerizable with the acrylate esters and the methacrylate esters other than methyl methacrylate, the total amount being 100 parts by weight.

Typical methods for manufacturing such polymer particles in latices prepared by emulsion polymerization according to the above-described procedures (1) to (3) are disclosed in detail in, but are not limited to, JP 2-269755 and JP 8-217817.

The polymer particles described in (1) to (3) above are preferably used because such polymer particles have been widely used as quality modifiers (impact modifier) for thermoplastic resins, and the coagulated particles having high quality can be recovered by the method of the present invention. However, coagulated particles from the latex prepared by emulsion polymerization usable in the present invention are not limited to these. For example, polymer particles from a latex prepared by copolymerization or graft polymerization of a monomer composition mainly composed of at least one monomer selected from the following monomer group may be used alone or as a mixture.

Examples of the monomer groups include (1) alkyl acrylates (acrylic acid ester) containing an alkyl group having 1 to 10 carbon atoms, for example, methyl acrylate, ethyl acrylate, butyl acrylate, and 2-ethylhexyl acrylate; (2) alkyl methacrylates (methacrylic acid ester) containing an alkyl group having 1 to 10 carbon atoms, for example, methyl methacrylate, ethyl methacrylate, butyl methacrylate, and 2-ethylhexyl methacrylate; (3) vinyl arenes (aromatic vinyl monomer) such as styrene, α-methylstyrene, monochlorostyrene, and dichlorostyrene; (4) vinyl carboxylic acids such as acrylic acid and methacrylic acid; (5) vinyl cyanides such as acrylonitrile and methacrylonitrile; (6) vinyl halides such as vinyl chloride, vinyl bromide, and chloroprene; (7) vinyl acetate; (8) alkenes such as ethylene, propylene, butylene, butadiene, and isobutylene; and (9) multi-functional monomers such as allyl methacrylate, diallyl phthalate, triallyl cyanurate, monoethylene glycol dimethacrylate, tetraethylene glycol dimethacrylate, divinylbenzene, and glycidyl methacrylate.

The volume average particle diameter of the polymer particles is not limited particularly. The polymer particles have a volume average particle diameter of preferably 0.05 to 0.5 μm, more preferably 0.06 to 0.3 μm, and even preferably 0.07 to 0.2 μm, which is the particle size in a latex prepared by emulsion polymerization of typical emulsion polymerization. The volume average particle size of the polymer particles can be measured by, for example, MICROTRAC UPA (manufactured by NIKKISO CO., LTD.).

The polymer solid content in the latex prepared by emulsion polymerization in the present invention is not particularly limited as long as an object of the present invention is achieved. The polymer solid content in the latex is preferably 10 to 40% by weight and more preferably 25 to 40% by weight. When the polymer solid content in the latex is less than 10% by weight, coagulated particles from the latex prepared by emulsion polymerization have decreased bulk specific gravity. When the polymer solid content in the latex is more than 40% by weight, it is difficult to smoothly discharge the latex prepared by emulsion polymerization from the nozzle in some cases. The polymer solid content in a latex can be measured by placing 0.5 g of the latex in a hot air convection dryer at 120° C. for 3 hours to volatilize moisture and then calculating the polymer solid content in the latex from the weights of the latex before drying and the polymer after drying. In the specification, the polymer solid content corresponds to a solid content of emulsion-polymerized material in the latex prepared by emulsion polymerization.

The latex prepared by emulsion polymerization has a viscosity of preferably 10 mPa·s or more, more preferably 15 mPa·s or more, even preferably 20 mPa·s or more at 25° C. The latex prepared by emulsion polymerization has a viscosity of preferably 100 mPa·s or less, more preferably 50 mPa·s or less, and even preferably 30 mPa·s or less at 25° C.

When the viscosity at 25° C. is less than 10 mPa·s, fine particle content increases because the latex prepared by emulsion polymerization to be discharged to a solution containing a coagulating agent is easily discharged as individual spherical shape in some cases. On the other hand, When the viscosity at 25° C. is more than 100 mPa·s, it is difficult to continuously discharge the latex to the solution containing a coagulating agent because the latex is hardly discharged from the nozzle and the nozzle is easily clogged.

The viscosity at 25° C. of the subject latex prepared by emulsion polymerization can be calculated by using Cannon-Fenske viscometer, Cannon-Fenske viscometer in reverse flow type, Ubbelohde viscometer and the like. As reference, distilled water has a viscosity of 0.8899 mPa·s at 25° C.

In the present invention, the thickener can be added as an aqueous solution or powders to the latex prepared by emulsion polymerization. It is preferable that the thickener is added to the latex as the aqueous solution due to simple operations. The concentration of the aqueous solution containing the thickener is not limited particularly, and preferably 0.01 to 10% by weight. In the case of less than 0.01% by weight of the concentration of the aqueous solution, it is necessary to use the aqueous solution in a large amount in order to add the thickener in a given amount. In the case of more than 10% by weight of the concentration of the aqueous solution, the handling of the aqueous solution becomes difficult due to high viscosity of the aqueous solution containing the thickener in some cases.

The thickener used in the present invention may be a known thickener, and can be used appropriately. The thickener is preferably a water-soluble polymer. The water-soluble polymer can include nonionic water-soluble polymer, anionic water-soluble polymer, cationic water-soluble polymer, and amphiphilic water-soluble polymer.

The water-soluble polymer is preferably nonionic water-soluble polymer. Concrete examples of the nonionic water-soluble polymer can include polyalkylene oxide such as polyethylene oxide, polypropylene oxide, polyvinyl alcohol, methylcellulose, hydroxyethyl methylcellulose, hydroxyethyl cellulose, hydroxypropyl methylcellulose, sodium polyacrylate, polyvinyl pyrrolidone, polyacrylamide, polydimethylaminoethyl methacrylate. The water-soluble polymer used in the present invention is particularly preferably polyethylene oxide, and methylcellulose.

The latex prepared by emulsion polymerization may contain a thickener having 600,000 to 8,000,000 of a viscous average molecular weight in a given amount.

The molecular weight of the thickener (for example, polyethylene oxide) is not limited particularly. The thickener (for example, polyethylene oxide) has a viscosity average molecular weight of preferably 600,000 to 8,000,000, more preferably 1,500,000 to 5,000,000. When the viscosity average molecular weight is less than 600,000, even if polyethylene oxide is added to a latex prepared by emulsion polymerization, a flocculated state is not formed; therefore, an object of the present invention sometimes cannot be achieved. On the other hand, when the viscosity average molecular weight is more than 8,000,000, the viscosity may be extremely increased by addition of polyethylene oxide to the latex prepared by emulsion polymerization to preclude stirring and mixing operations. The term "flocculated state of latex prepared by emulsion polymerization" means a state in which the viscosity of the system is increased by cross-linking the particles in the latex with the molecular chain of polyethylene oxide and the viscosity of latex prepared by emulsion polymerization is increased after polyethylene oxide is added. The viscosity average molecular weight of polyethylene oxide is measured with a benzene solvent at 20° C.

Polyethylene oxides may be polymeric compounds having ethylene oxide units produced by polymerization of ethylene oxide, and include, for example, polyethylene oxide, ethylene oxide adducts of higher alcohols, ethylene oxide adducts of alkylphenols, ethylene oxide adducts of fatty acids, ethylene oxide adducts of fatty acid esters with polyvalent alcohols, ethylene oxide adducts of higher alkylamines, ethylene oxide adducts of fatty acid amides, ethylene oxide adducts of oils and fats, and ethylene oxide adducts of polypropylene glycols.

Methods for adding the thickener include, but are not limited to, a single step addition, a stepwise addition, or continuous addition of a predetermined amount of the thickener to a latex.

In the case where the thickener is used as a solution, the concentration of the thickener in the solution is not limited particularly as long as the latex prepared by emulsion polymerization has the above viscosity. The concentration of the thickener in the solution is, for example, from 0.1% by weight to 10% by weight.

The amount of the thickener added on a solid content basis is preferably 0.01 to 3.0 parts by weight (100 to 30,000 ppm), more preferably 0.015 to 0.05 parts by weight (150 to 500 ppm) based on 100 parts by weight, on a solid basis, of the polymer of the latex prepared by emulsion polymerization. Addition of the thickener in an amount of less than 0.01 parts by weight tends to make it difficult to cause formation of the flocculated polymer component, and the fine particle content is increased by subsequent granulation in some cases. On the other hand, when the amount of the thickener added is more than 3.0 parts by weight, it is necessary to require a long residue time in the coagulating tank because the viscosity of the latex prepared by emulsion polymerization discharged from the nozzle becomes high, and the rate for aggregating the latex becomes slow. In addition, it is undesirable because uncoagulated latex is formed and the production cost is high.

The coagulating agent used in the present invention may be an inorganic acid (salt) and/or an organic acid (salt) having a property capable of coagulating and/or precipitating the latex prepared by emulsion polymerization. The coagulating agent may be used in an aqueous solution.

The coagulating agent is preferably one or more substances selected from the group consisting of a monovalent inorganic acid, a salt of a monovalent inorganic acid, a divalent inorganic acid, a salt of a divalent inorganic acid, a trivalent inorganic acid, a salt of a trivalent inorganic acid. The monovalent inorganic acid includes halogen acids such as chloric acid, bromic acid and iodic acid, and nitric acid. The divalent inorganic acid includes sulfuric acid and the like. The trivalent inorganic acid includes phosphate and the like. A cationic element or molecular capable of forming a salt with these acids includes group 13 metals such as alkaline metals, alkaline earth metals, transition metals such as iron, zinc, aluminium, and ammonium.

The coagulating agent is preferably one or more substances selected from a monovalent organic acid, a salt of a monovalent organic acid, a divalent organic acid, a salt of a divalent organic acid, and the like. The monovalent organic acid includes formate, acetate and the like. The salt of the monovalent organic acid includes a salt of formate or acetate with alkaline metal and the like. The divalent organic acid includes oxalic acid, malic acid, maleic acid, malonic acid, tartaric acid, and the like. The salt of the divalent organic acid includes a salt of acetate or formate with alkaline earth metal and the like.

Concrete examples of the solution containing the coagulating agent include aqueous solutions containing inorganic salts such as alkaline metal halides such as sodium chloride, potassium chloride, lithium chloride, sodium bromide, potassium bromide, lithium bromide, potassium iodide, sodium iodide; alkaline metal sulfates such as potassium sulfate, sodium sulfate; ammonium sulfate; ammonium chloride; alkaline metal nitrates such as sodium nitrate, potassium nitrate; calcium chloride, ferrous sulfate, magnesium sulfate, zinc sulfate, copper sulfate, barium chloride, ferrous chloride, ferric chloride, magnesium chloride, ferric sulfate, aluminum sulfate, potassium alum, and iron alum; aqueous solutions containing inorganic acids such as hydrochloric acid, sulfuric acid, nitric acid, and phosphoric acid; organic acids such as acetic acid and formic acid and aqueous solutions of the organic acids; aqueous solutions containing organic acid salts such as sodium acetate, calcium acetate, sodium formate, and calcium formate, which may be used alone or in combinations. Among these, aqueous solutions containing monovalent or divalent inorganic salts such as sodium chloride, potassium chloride, sodium sulfate, ammonium chloride, calcium chloride, magnesium chloride, magnesium sulfate, barium chloride; aqueous solutions containing monovalent or divalent inorganic acids such as hydrochloric acid, sulfuric acid can be preferably used. The method for adding the solution containing a coagulating agent is not limited particularly, and a method for adding the solution containing a coagulating agent in batch, division, or continuous addition can be used.

In order to discharge the latex prepared by emulsion polymerization in the solution containing a coagulating agent, the latex may be discharged from the nozzle, if necessary. When the latex is discharged from the nozzle, the coagulated materials can be easily prepared in the anisotropic shape (in the long shape). This is advantageous because the aggregates like particles can be further decreased, the distance (depth) from the interface with the solution containing a coagulating agent to the center of coagulated materials can be shortened, and the non-coagulation within the coagulated materials can be prevented. Therefore, the generation of fine particles at the time of crush can be prevented even if the coagulated materials are crushed to prepare the particles.

The method for discharging the latex in the solution containing a coagulating agent is, for example, (1) a method for discharging the latex to the liquid surface of the solution containing a coagulating agent, (2) a method for discharging the latex in the solution containing a coagulating agent, and the like. The method of above (1) may be a method for discharging the latex from holes opened in a container for accommodating the latex equipped outside a tank for accommodating the solution containing a coagulating agent, to the liquid surface of the solution containing a coagulating agent, a method for discharging the latex from a nozzle outlet of the nozzle for discharging the latex equipped outside a tank for accommodating the solution containing a coagulating agent, to the liquid surface of the solution containing a coagulating agent, and the like. The method of above (2) may be a method for discharging the latex from a nozzle outlet of a nozzle for discharging the latex in the solution containing a coagulating agent.

The nozzle outlet has, for example, a length of 4 mm or less, preferably 2.5 mm or less, more preferably 1.8 mm or less, even preferably 1.6 mm or less, and particularly preferably 1.4 mm or less from an inner circumference to a center part in cross sections of the nozzle outlet. The nozzle outlet has, for example, a length of 0.1 mm or more, preferably 0.3 mm or more or 0.4 mm or more from an inner circumference to a center part in cross sections of the nozzle outlet. The center part is the same as a central part in cross sections of the nozzle outlet or cross sections including an inner diameter of the nozzle.

When the length is more than 4 mm, the latex prepared by emulsion polymerization after discharged is not sufficiently coagulated in the solution containing a coagulating agent, and the bulk specific gravity of the coagulated particles becomes lower due to the incorporation of water into the coagulated particles in some cases. On the other hand, when the length is short, aggregates are cut by the flow of the solution containing a coagulating agent, and the productivity of the coagulated particles become lower because the continuum aggregates are hardly obtained.

The cross sectional area of the dipping nozzle is, for example, 0.1 mm$^2$ or more and 100 mm$^2$ or less, preferably 1 mm$^2$ or more and 80 mm$^2$ or less, more preferably 2 mm$^2$ or more and 70 mm$^2$ or less, and even preferably 4 mm$^2$ or more and 50 mm$^2$ or less. In the case of a large cross sectional area of the dipping nozzle, the center part of continuum aggregates cannot be coagulated sufficiently to decrease the bulk specific gravity. In the case of a small cross sectional area of the dipping nozzle, the latex prepared by emulsion polymerization is hardly discharged from the nozzle to clog the nozzle in some cases.

The coagulation may be carried out by discharging the latex prepared by emulsion polymerization from the nozzle, and moving far away from the nozzle outlet in the solution containing a coagulating agent, to coagulate the latex prepared by emulsion polymerization. This step serves as a step of preparing hard aggregates from soft aggregates of the latex prepared by emulsion polymerization. In the step, the time required in the formation of the hard aggregates is maintained, and the hard aggregates are continuously prepared. The step can be carried out by satisfying the following condition with regard to the velocity speed at the nozzle outlet, making the flow in the solution containing a coagulating agent, and the like.

The coagulation may be carried out by making a flow in the solution containing the coagulating agent, and coagulating the latex prepared by emulsion polymerization in the solution containing a coagulating agent, to prepare the coagulated particles in the anisotropic shape, under conditions that the nozzle outlet for discharging the latex prepared by emulsion polymerization is directed to a direction in the range of ±90° relative to a direction of the flow, and the latex prepared by emulsion polymerization is discharged from the nozzle outlet at a linear velocity of 0.3 to 2 m/s.

The nozzle (preferably dipping nozzle) for discharging the latex is preferably a circular tube having an inner diameter of from 1 mm to 4 mm in discharging part, or a nozzle having a flat nozzle outlet with a longer diameter of from 4 mm to 300 mm and a shorter diameter of from 1 mm to 4 mm. As the nozzle, a nozzle having a single tube for specially discharging the latex prepared by emulsion polymerization, and multi-tubes such as two or more tubes for discharging the latex prepared by emulsion polymerization and the solution containing a coagulating agent from each of discharging parts, and the like can be used. The structure of the discharging part of the nozzle may be those having pores opened in the lateral side of the tube, or those having lateral tubes for guiding the latex discharged from the discharging part to the direction of the flow in the tank. The nozzle (preferably dipping nozzle) can be equipped with any number such as one piece or two or more pieces according to the product scale. The nozzle can be set such that the nozzle is dipped from the upper part of the tank for coagulating the latex into the liquid phase, the nozzle is dipped at the wall or the bottom of the tank for coagulating the latex into the liquid phase. In the case where a circular tube having an inner diameter of more than 4 mm in discharging part, or a nozzle having a flat nozzle outlet with a shorter diameter of more than 4 mm is used, water is taken into the latex prepared by emulsion polymerization during coagulation, so that the bulk specific gravity of the obtained aggregates is decreased.

In addition, it is preferable that the flow of the solution containing a coagulating agent is formed, the nozzle outlet of the nozzle (preferably dipping nozzle) for discharging the latex prepared by emulsion polymerization is directed to a direction in the range of ±90° relative to the direction of the flow. It is important that the direction of the nozzle outlet for discharging the latex is the same direction as the flow of the solution containing a coagulating agent within the tank for coagulation.

In the present invention, in the case where a direction for discharging the latex prepared by emulsion polymerization from the nozzle (a vector directed to a direction of discharging the latex prepared by emulsion polymerization) and a direction for the flow of the solution containing a coagulating agent (a vector directed to a direction of the flow of the solution containing a coagulating agent) are projected on the same plane (for example, the liquid surface of the solution containing a coagulating agent), the angle of the nozzle means an angle formed by the vector directed to a direction of discharging the latex prepared by emulsion polymerization and the vector directed to a direction of the flow of the solution containing a coagulating agent, and among a major angle having a larger angle and a minor angle having a smaller angle, the angle of the nozzle corresponds to the minor angle.

In addition, the same plane may be a plane parallel to a liquid surface of the solution containing a coagulating agent, and both vectors may present on the parallel plane. When both vectors are not present on a plane parallel to the liquid surface of the solution containing a coagulating agent, aggregates discharged from the nozzle are further aggregated, and the productivity of the aggregates cannot be improved.

The angle formed by the direction of discharging the latex prepared by emulsion polymerization and the direction of the flow of the solution containing a coagulating agent is preferably less than 90°, more preferably 60° or less, even preferably 30° or less, and particularly preferably 10° or less.

It is most preferable that the nozzle is set in the coagulating tank such that a direction of discharging the latex prepared by emulsion polymerization is parallel to a direction of the flow of the solution containing a coagulating agent, that is, the angle is 0°.

When the nozzle is set in the coagulating tank such that the angle formed by the direction of discharging the latex prepared by emulsion polymerization and the direction of the flow of the solution containing a coagulating agent becomes larger, the nozzle is easily clogged, and aggregates from the latex generated become finer and the bulk specific gravity is decreased in some cases.

The length for dipping the nozzle varies according to the shape of the coagulating tank and the stirring methods, but is not particularly limited. When the nozzle outlet is near the bottom and walls of the coagulating tank, the aggregates are adhered to bottom and walls of the coagulating tank.

The nozzle outlet may be set above the liquid surface of the solution containing a coagulating agent, or within the solution containing a coagulating agent. The nozzle outlet of the dipping nozzle is preferably set within the solution containing a coagulating agent.

In the coagulating step, the latex prepared by emulsion polymerization is discharged from the nozzle (preferably dipping nozzle) such that the linear velocity of the latex prepared by emulsion polymerization at the nozzle outlet is, for example, 0.3 to 2 m/s, preferably 0.5 to 2 m/s, and more preferably 0.7 to 1.5 m/s. In the case of more than 2 m/s of the linear velocity, the polymer contained in the latex around the nozzle discharging part is diffused, the miniaturization of generated particles and the decrease of the bulk specific gravity are found in some cases. In addition, in the case of less than 0.3 m/s of the linear velocity, it is difficult to stably discharge the latex prepared by emulsion polymerization from the nozzle, and there is the possibility to cause the clogging of the nozzle.

On the other hand, the coagulating agent may previously be fed in the tank for coagulation, and may simultaneously be added to the tank during the discharge of the latex prepared by emulsion polymerization from the nozzle. In addition, the coagulating agent may be continuously fed to the tank together with the latex from each of outlets in the case where the nozzle for introducing the latex into the tank has a double pipe.

Aggregates having the anisotropic shape, which is obtained by discharging the latex prepared by emulsion polymerization containing a thickener into a solution containing a coagulating agent from the nozzle, have, for example, a bundle shape, a long shape, a continuous shape, a strand shape, or a string shape. The aggregates mean aggregates in which the latex prepared by emulsion polymerization discharged from the nozzle hardly becomes fine particles, and is coagulated in the same size as a diameter of the nozzle outlet. The aggregates are those having the above shape except the isotropic shape such as ball, oval, and cube.

The aggregates having the anisotropic shape from the latex prepared by emulsion polymerization have the average size of preferably 0.01 to 100 cm$^3$, and more preferably 0.1 to 5 cm$^3$.

Further, the latex prepared by emulsion polymerization may be discharged in a medium other than the solution containing a coagulating agent. That is, the present invention may be used in other methods such as a method for coagulating the latex containing the polymer in gas-phase, a method for softly coagulating the latex containing the polymer in liquid-phase (for example, see Patent Document 2) and the like.

In other embodiment, the present invention encompasses a method for manufacturing coagulated particles from a latex prepared by emulsion polymerization, containing steps of crushing aggregates in a solution containing a coagulating agent obtained by the above method, and maintaining a resultant mixture at 60 to 100° C. for 1 to 60 minutes.

In the present invention, it is preferable that a crushing step for sizing the aggregates of the latex prepared by emulsion polymerization is carried out after a coagulating step. In the crushing step, it is preferable that the major of coarse particles are selectively crushed, and the fine particles are not crushed. Concretely, it is preferable that the coarse particles having the volume average particle diameter of more than 1000 μm are selectively crushed, and the fine particles having the volume average particle diameter of 50 μm or less are hardly crushed. The aggregates are crushed under the condition, and the distribution of the particle diameter can be controlled. As a result, the aggregated particles from the latex prepared by emulsion polymerization can be obtained as particles having excellent powder property, that is, particles having a high bulk specific gravity, and small contents of coarse particles and fine particles. For crush of aggregates, known crushing devices such as wet crushing pump such as static mixer, inline mixer are used. A machine for mainly crushing particles having a given particle diameter or more is preferable. It is preferable that disintegrator manufactured by Husqvarna Zenoah Co. Ltd as shown in FIG. 2 or Scatter pump manufactured by Sanwa Hydrotech Corporation is used as a crushing machine.

The crushing machine as shown in FIG. 2 mainly includes impeller 3 rotating around rotating axis 2 within casing body 1, crushing impeller 5 which is equipped to the tip of the rotating axis 2 and rotates with impeller 3 on the suction passage 4 side of the casing body 1, intermediate casing 6 fixed with a bolt in the suction passage 4 of the casing body 1, and graded fixed blade 7 fixed through a given clearance to the back face of the crushing impeller 5 in the inner circumference side of the intermediate casing 6. Impeller 3 is an impeller for feeding slurry, and the impeller is not necessarily used. It is preferable that an impeller having no effect on crush of slurry is used. By such a crushing machine, the coarse particles having the volume average particle size of 1000 μm or more can be selectively crushed without hardly crushing fine particles having the volume average particle size of 50 μm or less in the slurry solution. The volume average particle diameter of the coagulated particles can be measured by laser diffraction-scattering type particle size distribution measuring device LA-950 manufactured by HORIBA. Ltd.

The number of rotations of crushing impeller is, for example, 100 to 3000 rpm. The opening sieve of a graded fixed blade is, for example, 0.1 mm to 5 mm. Under these conditions, aggregates may be repeatedly crushed by circulating the solution containing a coagulating agent for 0.1 minutes to 30 minutes. Coagulated particles of polymer can be obtained after crushing the aggregates.

In the present invention, it is preferable that fusion between polymers in the coagulated particles is accelerated by the heat treatment of the coagulating particles of the polymer. Although the temperature of the heat treatment does not have an upper limit, in general, the temperature of the heat treatment is preferably 120° C. or less, preferably 60 to 100° C., more preferably 65 to 95° C., and even preferably 70 to 90° C. The time of the heat treatment is, for example, 1 to 60 minutes, and preferably 5 to 50 minutes.

Thereby, the mechanical strength of the coagulated particles further increases and the water content of the coagulated particles decreases. Before the heat treatment, in order to suppress the aggregation of particles during heating and during or after drying, it is preferable that latex for rigid non-elastic copolymer on a solid content basis is added in an amount of 0.5 to 3 parts by weight per 100 parts by weight of aggregates.

After the treatment for preventing aggregation between particles, dehydrating and drying operations can be carried out according to conventional methods to prepare coagulated particles of the present invention.

As the rigid non-elastic copolymer, a rigid non-elastic polymer obtained by polymerizing a slight amount (for example, 30% by weight or less, preferably 20% by weight or less, more preferably 10% by weight or less, and particularly preferably 0% by weight per 100% by weight of polymer) of a monomer capable of forming a rubber elastic body such as butadiene, and a monomer different from the monomer capable of forming a rubber elastic body can be used.

The monomer different from the monomer capable of forming the rubber elastic body includes 1) alkyl methacrylates having an alkyl group having 10 or less of carbon atoms such as methyl methacrylate, ethyl methacrylate, butyl methacrylate, 2-ethylhexylmethacrylate; 2) vinylarenes such as styrene, α-methyl styrene, monochlorostyrene, dichlorostyrene, 3) vinyl cyanide such as acrylonitrile, 4) multifunctional monomers such as 1,3-butyleneglycol dimethacrylate, allyl methacrylate, diallyl phthalate, triallyl cyanurate, monoethyleneglycol dimethacrylate, tetraethyleneglycol dimethacrylate, divinyl benzene, and glycidyl methacrylate. These monomers can be used alone or in combination of two or more kinds.

The bulk specific gravity of the coagulated particles from the latex prepared by emulsion polymerization is, for example, 0.35 g/cm$^3$ or more, and preferably 0.36 g/cm$^3$ or more.

A cumulative volume frequency of particles of 50 μm or less is preferably 10% or less, more preferably 9% or less, and even preferably 8.5% or less in the distribution of a volume particle diameter of the coagulated particles from the latex prepared by emulsion polymerization.

A cumulative volume frequency of particles of more than 1000 μm is preferably 2.0% or less, and more preferably 1.9% or less in the distribution of a volume particle diameter of coagulated particles from the latex prepared by emulsion polymerization.

The water content of the coagulated particles from the latex prepared by emulsion polymerization is, for example, 15 to 30%, and preferably 20 to 25%.

According to the method for manufacturing coagulated particles from the latex prepared by emulsion polymerization of the present invention, the coagulated particles from the latex prepared by emulsion polymerization have excellent effects such as small contents of fine particles having a volume average particle diameter of 50 μm or less and coarse particles having a volume average particle diameter of more than 1000 μm, and a high bulk specific gravity, compared with conventional granulating processes such as salting-out techniques. In addition, the coagulated particles from the latex prepared by emulsion polymerization obtained by the method for preparing the coagulated particles of the present invention have a preferred powder property as a modifier (especially, impact modifier) for vinyl chloride resin and the like.

The coagulated particles from the latex prepared by emulsion polymerization obtained by the method for preparing the coagulated particles of the present invention have an excellent dispersibility in the molding after the blend of the coagulated particles with a polymer such as vinyl chloride resin. Further, according to the method for manufacturing coagulated particles from the latex prepared by emulsion polymerization of the present invention, coagulated particles from latex prepared by emulsion polymerization having small water content can be obtained.

The present application claims the benefit of priorities to Japanese Patent Application Number 2014-64265 filed on Mar. 26, 2014 and Japanese Patent Application Number 2014-110592 filed on May 28, 2014. The entire contents of the specifications of Japanese Patent Application Number 2014-64265 filed on Mar. 26, 2014 and Japanese Patent Application Number 2014-110592 filed on May 28, 2014 are hereby incorporated by reference.

EXAMPLES

The present invention will now be described in further detail on the basis of examples, but the present invention is not limited to these examples.
(Measurement of Water Content after Dehydration of Coagulated Particles from Latex Prepared by Emulsion Polymerization (Coagulated Particles))

A slurry (100 g) (solid content: 14% by weight) containing coagulated particles prepared in each Example and each Comparative Example was subjected to suction filtration with an aspirator for 3 minutes. Subsequently, the dehydrated resin was recovered and dried at 100° C. for 12 hours in a hot air convection dryer to evaporate water. The water content after dehydration was determined by the following (equation 1):

$$\text{Water content after dehydration (\%)} = [(Ww - Wd)/Ww] \times 100 \quad \text{(equation 1)}$$

wherein Ww represents the weight of the resin immediately after dehydration and before drying and Wd represents the weight of the resin after drying.

The water content of coagulated particles obtained in each Example was 20 to 25%.
(Measurement of Particle Diameter Distribution Based on Volume Cumulative Frequency)

The particle diameter distribution of coagulated particles in a slurry prepared in each Example and each Comparative Example was measured with laser diffraction-scattering particle size distribution measuring device LA-950 (manufactured by HORIBA. Ltd). The particle diameter distribution was determined from the volume cumulative frequency (%) of particles having a volume average particle diameter of 50 μm or less and more than 1000 μm.
(Measurement of Bulk Specific Gravity)

The bulk specific gravity of the coagulated particles from the latex prepared by emulsion polymerization was measured by bulk specific gravity measuring device (manufactured by Kuramochi Scientific Instruments Co., Ltd, JIS K-6720 type).
(Measurement of Viscosity of Latex Prepared by Emulsion Polymerization at 25° C.)

The viscosity of the obtained latex prepared by emulsion polymerization at 25° C. was measured with Brookfield viscometer (BL2 type manufactured by TOKI SANGYO Co. LTD).

Hereinafter, "parts" or "%" used in Examples and Comparative Examples indicates "parts by weight" or "% by weight", respectively. In addition, average particle size used in Examples and Comparative Examples means a volume average particle diameter.

Example 1

Preparation of Latex Prepared by Emulsion Polymerization

Preparation of Diene Rubber Polymer (R-1)

To a polymerization vessel (pressure resistant reactor equipped with stirrer) having a capacity of 100 L, was fed 200 parts of deionized water, the inside of the polymerization vessel was subjected to deaeration, substitution with nitrogen gas, and stirring. Further, to the polymerization vessel was fed 2.5 parts of sodium oleate, 0.002 parts of ferrous sulfate ($FeSO_4 \cdot 7H_2O$), 0.01 parts of disodium ethylenediaminetetraacetate (hereinafter, referred to as EDTA), 0.2 parts of sodium formaldehyde sulfoxylate, 0.2 parts of tripotassium phosphate, 100 parts of butadiene, 0.5 parts of divinyl benzene, and 0.1 parts of diisopropylbenzene hydroperoxide.

The polymerization vessel was subjected to polymerization reaction at 40° C. for 10 hours, and then was maintained at 60° C. for 4 hours. As a result, a diene rubber latex having a polymerization converting rate of 98%, a volume average particle diameter of 0.08 µm and a polymer solid content of 32.5% was prepared.

Preparation of Graft Polymer (G-1)

To a glass reactor equipped with a thermometer, a stirrer, a reflux condenser, an inlet for a nitrogen gas, and a device for adding a monomer and an emulsion were added 70 parts of diene rubber latex prepared by emulsion polymerization on a solid basis, 50 parts of water, 0.004 parts of ferrous sulfate ($FeSO_4 \cdot 7H_2O$), 0.005 parts of EDTA.2Na, 0.1 parts of sodium formaldehyde sulfoxylate. The glass reactor was heated to maintain the temperature of the mixture at 60° C. Then, the mixture containing 22 parts of methylmethacrylate, 3 parts of styrene, 5 parts of butylacrylate, and 0.1 parts of cumene hydroperoxide was continuously added thereto over 4 hours. Further, the polymerization vessel was subjected to polymerization reaction at 60° C. for 1 hour to complete the polymerization reaction. As a result, a latex prepared by emulsion polymerization having a volume average particle diameter of 0.23 µm was prepared.

Preparation of Rigid Non-Elastic Polymer Latex (P-1)

A polymerization vessel (pressure resistant reactor equipped with stirrer) having a capacity of 100 L was charged with 200 parts of deionized water, 0.3 parts of sodium oleate, 0.002 parts of ferrous sulfate ($FeSO_4 \cdot 7H_2O$), 0.005 parts of EDTA.2Na, 0.2 parts of sodium formaldehyde sulfoxylate, with stirring. The temperature of the polymerization vessel was increased at 70° C., the mixture containing 45 parts of methylmethacrylate (MMA), 45 parts of styrene, 10 parts of 1,3-butyleneglycoldimethacrylate, 0.3 parts of cumene hydroperoxide was continuously added thereto over 7 hours. At the time of 2 hours, 4 hours, and 6 hours of the polymerization, 0.3 parts of sodium oleate was added. After the continuous addition of the mixture containing the monomers, the stirring was maintained for 2 hours to prepare a rigid non-elastic polymer latex (P-1) having a polymerization converting rate of 99%.

Coagulating Step-Crushing Step of Aggregates-Heating Step

The latex prepared by emulsion polymerization in an amount of 1000 g (350 g as 100 parts of polymer solid content) was weighed, and the temperature of the latex was adjusted to 40° C. (polymer solid content of 35%). With stirring, 17.5 g of an aqueous solution containing 1% polyethylene oxide (PEO-8Z, viscosity average molecular weight: 1,700,000 to 2,200,000, manufactured by Sumitomo Seika Chemicals Company Limited) was added thereto. The polyethylene oxide solid content was 0.05 parts per 100 parts of polymer solid content of latex prepared by emulsion polymerization, and the viscosity of the latex prepared by emulsion polymerization at 25° C. was 23 mPa·s. The latex (the latex containing polyethylene oxide 11 as shown in FIG. 1) prepared by emulsion polymerization containing polyethylene oxide was continuously discharged from a dipping nozzle (dipping nozzle 13 as shown in FIG. 1) of a circular tube having an inner diameter of 3 mm at a linear velocity of 1.0 m/s such that the angle between the direction of the flow of 0.1% aqueous solution of hydrochloric acid (coagulating agent 12 as shown in FIG. 1) and the direction of discharging the latex prepared by emulsion polymerization was maintained at 30° in a plane parallel to the liquid surface of the solution containing a coagulating agent, to prepare polymer aggregates having a string shape and an average size of 0.5 cm³. The polymer aggregates were repeatedly crushed by disintegrator (crushing pump 15 as shown in FIG. 1) manufactured by Husqvarna Zenoah Co. Ltd (KD80MS) for 3 minutes under operation conditions of the rotating rate of 1800 rpm of a crushing impeller and the open sieving of 1.0 mm of a graded fixed blade, to prepare a slurry having 14% of solid content. In order to prevent the aggregation between aggregated polymer particles, 1 part of rigid non-elastic polymer latex (P-1) was added thereto per 100 parts of polymer solid content. The resulting mixture was heated to 85° C. for 5 minutes. The results of a particle diameter distribution and a bulk specific gravity of the obtained coagulated particles are shown in Table 1.

Example 2

The latex prepared by emulsion polymerization having a volume average particle diameter of 0.23 µm and a polymer solid content of 35% was prepared in the same manner as Example 1. The latex prepared by emulsion polymerization in an amount of 1000 g (350 g as 100 parts of polymer solid content) was weighed, and the temperature of the latex was adjusted to 40° C. With stirring, 17.5 g of an aqueous solution containing 1% polyethylene oxide (PEO-8Z, viscosity average molecular weight: 1,700,000 to 2,200,000, manufactured by Sumitomo Seika Chemicals Company Limited) was added thereto. The polyethylene oxide solid content was 0.05 parts per 100 parts of polymer solid content of latex prepared by emulsion polymerization, and the viscosity of the latex prepared by emulsion polymerization at 25° C. was 23 mPa·s. The latex prepared by emulsion polymerization containing polyethylene oxide was continuously discharged from a dipping nozzle of a circular tube having an inner diameter of 5 mm at a linear velocity of 1.0 m/s such that the angle between the direction of the flow of 0.1% aqueous solution of hydrochloric acid and the direction of discharging the latex prepared by emulsion polymerization was maintained at 30° in a plane parallel to the liquid surface of the solution containing a coagulating agent, to prepare polymer aggregates having a string shape. The polymer aggregates were repeatedly crushed by disintegrator manufactured by Husqvarna Zenoah Co. Ltd (KD80MS) for 3 minutes under operation conditions of the rotating rate of 1800 rpm of a crushing impeller and the open sieving of 1.0 mm of a graded fixed blade, to prepare a slurry having 14% of solid content. In order to prevent the aggregation between aggregated polymer particles, 1 part of rigid non-elastic polymer latex (P-1) was added thereto per 100 parts of polymer solid content. The resulting mixture was heated to 85° C. for 5 minutes. The results of a particle diameter distribution and a bulk specific gravity of the obtained coagulated particles are shown in Table 1.

Example 3

The latex prepared by emulsion polymerization having a volume average particle diameter of 0.23 μm and a polymer solid content of 35% was prepared in the same manner as Example 1. The latex prepared by emulsion polymerization in an amount of 1000 g (350 g as 100 parts of polymer solid content) was weighed, and the temperature of the latex was adjusted to 40° C. With stirring, 17.5 g of an aqueous solution containing 1% polyethylene oxide (PEO-8Z, viscosity average molecular weight: 1,700,000 to 2,200,000, manufactured by Sumitomo Seika Chemicals Company Limited) was added thereto. The polyethylene oxide solid content was 0.05 parts per 100 parts of polymer solid content of latex prepared by emulsion polymerization, and the viscosity of the latex prepared by emulsion polymerization at 25° C. was 23 mPa·s. The latex prepared by emulsion polymerization containing polyethylene oxide was continuously discharged from a dipping nozzle having a flat nozzle outlet having a long diameter of 10 mm and a short diameter of 3 mm at a linear velocity of 1.0 m/s such that the angle between the direction of the flow of 0.1% aqueous solution of hydrochloric acid and the direction of discharging the latex prepared by emulsion polymerization was maintained at 30° in a plane parallel to the liquid surface of the solution containing a coagulating agent, to prepare polymer aggregates having a string shape. The polymer aggregates were repeatedly crushed by disintegrator manufactured by Husqvarna Zenoah Co. Ltd (KD80MS) for 3 minutes under operation conditions of the rotating rate of 1800 rpm of a crushing impeller and the open sieving of 1.0 mm of a graded fixed blade, to prepare a slurry having 14% of solid content. In order to prevent the aggregation between aggregated polymer particles, 1 part of rigid non-elastic polymer latex (P-1) was added thereto per 100 parts of polymer solid content. The resulting mixture was heated to 85° C. for 5 minutes. The results of a particle diameter distribution and a bulk specific gravity of the obtained coagulated particles are shown in Table 1.

Example 4

The latex prepared by emulsion polymerization having a volume average particle diameter of 0.23 μm and a polymer solid content of 35% was prepared in the same manner as Example 1. The latex prepared by emulsion polymerization in an amount of 1000 g (350 g as 100 parts of polymer solid content) was weighed, and the temperature of the latex was adjusted to 40° C. With stirring, 17.5 g of an aqueous solution containing 1% polyethylene oxide (PEO-8Z, viscosity average molecular weight: 1,700,000 to 2,200,000, manufactured by Sumitomo Seika Chemicals Company Limited) was added thereto. The polyethylene oxide solid content was 0.05 parts per 100 parts of polymer solid content of latex prepared by emulsion polymerization, and the viscosity of the latex prepared by emulsion polymerization at 25° C. was 23 mPa·s. The latex prepared by emulsion polymerization containing polyethylene oxide was continuously discharged from a dipping nozzle having a flat nozzle outlet having a long diameter of 10 mm and a short diameter of 3 mm at a linear velocity of 0.7 m/s such that the angle between the direction of the flow of 0.1% aqueous solution of hydrochloric acid and the direction of discharging the latex prepared by emulsion polymerization was maintained at 30° in a plane parallel to the liquid surface of the solution containing a coagulating agent, to prepare polymer aggregates having a string shape. The polymer aggregates were repeatedly crushed by disintegrator manufactured by Husqvarna Zenoah Co. Ltd (KD80MS) for 3 minutes under operation conditions of the rotating rate of 1800 rpm of a crushing impeller and the open sieving of 1.0 mm of a graded fixed blade, to prepare a slurry having 14% of solid content. In order to prevent the aggregation between aggregated polymer particles, 1 part of rigid non-elastic polymer latex (P-1) was added thereto per 100 parts of polymer solid content. The resulting mixture was heated to 85° C. for 5 minutes. The results of a particle diameter distribution and a bulk specific gravity of the obtained coagulated particles are shown in Table 1.

Example 5

The latex prepared by emulsion polymerization having a volume average particle diameter of 0.23 μm and a polymer solid content of 35% was prepared in the same manner as Example 1. The latex prepared by emulsion polymerization in an amount of 1000 g (350 g as 100 parts of polymer solid content) was weighed, and the temperature of the latex was adjusted to 40° C. With stirring, 17.5 g of an aqueous solution containing 1% polyethylene oxide (PEO-8Z, viscosity average molecular weight: 1,700,000 to 2,200,000, manufactured by Sumitomo Seika Chemicals Company Limited) was added thereto. The polyethylene oxide solid content was 0.05 parts per 100 parts of polymer solid content of latex prepared by emulsion polymerization, and the viscosity of the latex prepared by emulsion polymerization at 25° C. was 23 mPa·s. The latex prepared by emulsion polymerization containing polyethylene oxide was continuously discharged from a dipping nozzle having a flat nozzle outlet having a long diameter of 10 mm and a short diameter of 3 mm at a linear velocity of 1.5 m/s such that the angle between the direction of the flow of 0.1% aqueous solution of hydrochloric acid and the direction of discharging the latex prepared by emulsion polymerization was maintained at 30° in a plane parallel to the liquid surface of the solution containing a coagulating agent, to prepare polymer aggregates having a string shape. The polymer aggregates were repeatedly crushed by disintegrator manufactured by Husqvarna Zenoah Co. Ltd (KD80MS) for 3 minutes under operation conditions of the rotating rate of 1800 rpm of a crushing impeller and the open sieving of 1.0 mm of a graded fixed blade, to prepare a slurry having 14% of solid content. In order to prevent the aggregation between aggregated polymer particles, 1 part of rigid non-elastic polymer latex (P-1) was added thereto per 100 parts of polymer solid content. The resulting mixture was heated to 85° C. for 5 minutes. The results of a particle diameter distribution and a bulk specific gravity of the obtained coagulated particles are shown in Table 1.

Example 6

The latex prepared by emulsion polymerization having a volume average particle diameter of 0.23 μm and a polymer solid content of 35% was prepared in the same manner as Example 1. The latex prepared by emulsion polymerization in an amount of 1000 g (350 g as 100 parts of polymer solid content) was weighed, and the temperature of the latex was adjusted to 40° C. With stirring, 35 g of an aqueous solution containing 1% polyethylene oxide (PEO-3Z, viscosity average molecular weight: 600,000 to 1,100,000, manufactured by Sumitomo Seika Chemicals Company Limited) was added thereto. The polyethylene oxide solid content was 0.1 parts per 100 parts of polymer solid content of latex prepared by emulsion polymerization, and the viscosity of the latex prepared by emulsion polymerization at 25° C. was 18 mPa·s. The latex prepared by emulsion polymerization containing polyethylene oxide was continuously discharged from a dipping nozzle having a flat nozzle outlet having a long diameter of 10 mm and a short diameter of 3 mm at a linear velocity of 1.0 m/s such that the angle between the direction of the flow of 0.1% aqueous solution of hydrochloric acid and the direction of discharging the latex prepared by emulsion polymerization was maintained at 30° in a plane parallel to the liquid surface of the solution containing a coagulating agent, to prepare polymer aggregates having a string shape. The polymer aggregates were repeatedly crushed by disintegrator manufactured by Husqvarna Zenoah Co. Ltd (KD80MS) for 3 minutes under operation conditions of the rotating rate of 1800 rpm of a crushing impeller and the open sieving of 1.0 mm of a graded fixed blade, to prepare a slurry having 14% of solid content. In order to prevent the aggregation between aggregated polymer particles, 1 part of rigid non-elastic polymer latex (P-1) was added thereto per 100 parts of polymer solid content. The resulting mixture was heated to 85° C. for 5 minutes. The results of a particle diameter distribution and a bulk specific gravity of the obtained coagulated particles are shown in Table 1.

Example 7

The latex prepared by emulsion polymerization having a volume average particle diameter of 0.23 µm and a polymer solid content of 35% was prepared in the same manner as Example 1. The latex prepared by emulsion polymerization in an amount of 1000 g (350 g as 100 parts of polymer solid content) was weighed, and the temperature of the latex was adjusted to 40° C. With stirring, 17.5 g of an aqueous solution containing 0.5% polyethylene oxide (PEO-18Z, viscosity average molecular weight: 4,300,000 to 4,800,000, manufactured by Sumitomo Seika Chemicals Company Limited) was added thereto. The polyethylene oxide solid content was 0.025 parts per 100 parts of polymer solid content of latex prepared by emulsion polymerization, and the viscosity of the latex prepared by emulsion polymerization at 25° C. was 27 mPa·s. The latex prepared by emulsion polymerization containing polyethylene oxide was continuously discharged from a dipping nozzle having a flat nozzle outlet having a long diameter of 10 mm and a short diameter of 3 mm at a linear velocity of 1.0 m/s such that the angle between the direction of the flow of 0.1% aqueous solution of hydrochloric acid and the direction of discharging the latex prepared by emulsion polymerization was maintained at 30° in a plane parallel to the liquid surface of the solution containing a coagulating agent, to prepare polymer aggregates having a string shape. The polymer aggregates were repeatedly crushed by disintegrator manufactured by Husqvarna Zenoah Co. Ltd (KD80MS) for 3 minutes under operation conditions of the rotating rate of 1800 rpm of a crushing impeller and the open sieving of 1.0 mm of a graded fixed blade, to prepare a slurry having 14% of solid content. In order to prevent the aggregation between aggregated polymer particles, 1 part of rigid non-elastic polymer latex (P-1) was added thereto per 100 parts of polymer solid content. The resulting mixture was heated to 85° C. for 5 minutes. The results of a particle diameter distribution and a bulk specific gravity of the obtained coagulated particles are shown in Table 1.

Example 8

The latex prepared by emulsion polymerization having a volume average particle diameter of 0.23 µm and a polymer solid content of 35% was prepared in the same manner as Example 1. The latex prepared by emulsion polymerization in an amount of 1000 g (350 g as 100 parts of polymer solid content) was weighed, and the temperature of the latex was adjusted to 40° C. With stirring, 17.5 g of an aqueous solution containing 1% methyl cellulose (METOLOSE (registered trademark) MC60SH-50, manufactured by Shin-Etsu Chemical Co., Ltd) was added thereto. The polyethylene oxide solid content was 0.05 parts per 100 parts of polymer solid content of latex prepared by emulsion polymerization, and the viscosity of the latex prepared by emulsion polymerization at 25° C. was 19 mPa·s. The latex prepared by emulsion polymerization containing methyl cellulose was continuously discharged from a dipping nozzle having a flat nozzle outlet having a long diameter of 10 mm and a short diameter of 3 mm at a linear velocity of 1.0 m/s such that the angle between the direction of the flow of 0.1% aqueous solution of hydrochloric acid and the direction of discharging the latex prepared by emulsion polymerization was maintained at 30° in a plane parallel to the liquid surface of the solution containing a coagulating agent, to prepare polymer aggregates having a string shape. The polymer aggregates were repeatedly crushed by disintegrator manufactured by Husqvarna Zenoah Co. Ltd (KD80MS) for 3 minutes under operation conditions of the rotating rate of 1800 rpm of a crushing impeller and the open sieving of 1.0 mm of a graded fixed blade, to prepare a slurry having 14% of solid content. In order to prevent the aggregation between aggregated polymer particles, 1 part of rigid non-elastic polymer latex (P-1) was added thereto per 100 parts of polymer solid content. The resulting mixture was heated to 85° C. for 5 minutes. The results of a particle diameter distribution and a bulk specific gravity of the obtained coagulated particles are shown in Table 1.

Example 9

The latex prepared by emulsion polymerization having a volume average particle diameter of 0.23 µm and a polymer solid content of 35% was prepared in the same manner as Example 1. The latex prepared by emulsion polymerization in an amount of 1000 g (350 g as 100 parts of polymer solid content) was weighed, and the temperature of the latex was adjusted to 40° C. With stirring, 17.5 g of an aqueous solution containing 1% polyethylene oxide (PEO-3Z, viscosity average molecular weight: 600,000 to 1,100,000, manufactured by Sumitomo Seika Chemicals Company Limited) was added thereto. The polyethylene oxide solid content was 0.05 parts per 100 parts of polymer solid content of latex prepared by emulsion polymerization, and the viscosity of the latex prepared by emulsion polymerization at 25° C. was 23 mPa·s. The latex prepared by emulsion polymerization containing polyethylene oxide was continuously discharged from a dipping nozzle of a circular tube having an inner diameter of 8 mm at a linear velocity of 1.0 m/s such that the angle between the direction of the flow of 0.1% aqueous solution of hydrochloric acid and the direction of discharging the latex prepared by emulsion polymerization was maintained at 30° in a plane parallel to the liquid surface of the solution containing a coagulating agent, to prepare polymer aggregates having a string shape. The polymer aggregates were repeatedly crushed by disintegrator manufactured by Husqvarna Zenoah Co. Ltd (KD80MS) for 3 minutes under operation conditions of the rotating rate of 1800 rpm of a crushing impeller and the open sieving of 1.0 mm of a graded fixed blade, to prepare a slurry having 14% of solid content. In order to prevent the aggregation between aggregated polymer particles, 1 part of rigid non-elastic polymer latex (P-1) was added thereto per 100 parts of polymer solid content. The resulting mixture was heated to 85° C. for 5 minutes. The results of a particle diameter distribution and a bulk specific gravity of the obtained coagulated particles are shown in Table 1.

Comparative Example 1

The latex prepared by emulsion polymerization having a volume average particle diameter of 0.23 μm and a polymer solid content of 35% was prepared in the same manner as Example 1, and the viscosity of the latex prepared by emulsion polymerization at 25° C. was 7 mPa·s. The latex prepared by emulsion polymerization in an amount of 1000 g (350 g as 100 parts of polymer solid content) was weighed, the temperature of the latex was adjusted to 40° C. The latex prepared by emulsion polymerization without containing polyethylene oxide was continuously discharged from a dipping nozzle having a flat nozzle outlet having a long diameter of 10 mm and a short diameter of 3 mm at a linear velocity of 1.0 m/s such that the angle between the direction of the flow of 0.1% aqueous solution of hydrochloric acid and the direction of discharging the latex prepared by emulsion polymerization was maintained at 30° in a plane parallel to the liquid surface of the solution containing a coagulating agent, to prepare polymer aggregates having a string shape. The polymer aggregates were repeatedly crushed by disintegrator manufactured by Husqvarna Zenoah Co. Ltd (KD80MS) for 3 minutes under operation conditions of the rotating rate of 1800 rpm of a crushing impeller and the open sieving of 1.0 mm of a graded fixed blade, to prepare a slurry having 14% of solid content. In order to prevent the aggregation between aggregated polymer particles, 1 part of rigid non-elastic polymer latex (P-1) was added thereto per 100 parts of polymer solid content. The resulting mixture was heated to 85° C. for 5 minutes. The results of a particle diameter distribution and a bulk specific gravity of the obtained coagulated particles are shown in Table 1.

Comparative Example 2

The latex prepared by emulsion polymerization having a volume average particle diameter of 0.23 μm and a polymer solid content of 35% was prepared in the same manner as Example 1, and the viscosity of the latex prepared by emulsion polymerization at 25° C. was 7 mPa·s. The latex prepared by emulsion polymerization in an amount of 1000 g (350 g as 100 parts of polymer solid content) was weighed, the temperature of the latex was adjusted to 40° C. The latex prepared by emulsion polymerization without containing polyethylene oxide was continuously discharged from a dipping nozzle of a circular tube having an inner diameter of 8 mm at a linear velocity of 1.0 m/s such that the angle between the direction of the flow of 0.1% aqueous solution of hydrochloric acid and the direction of discharging the latex prepared by emulsion polymerization was maintained at 30° in a plane parallel to the liquid surface of the solution containing a coagulating agent, to prepare polymer aggregates having a string shape. The polymer aggregates were repeatedly crushed by disintegrator manufactured by Husqvarna Zenoah Co. Ltd (KD80MS) for 3 minutes under operation conditions of the rotating rate of 1800 rpm of a crushing impeller and the open sieving of 1.0 mm of a graded fixed blade, to prepare a slurry having 14% of solid content. In order to prevent the aggregation between aggregated polymer particles, 1 part of rigid non-elastic polymer latex (P-1) was added thereto per 100 parts of polymer solid content. The resulting mixture was heated to 85° C. for 5 minutes. The results of a particle diameter distribution and a bulk specific gravity of the obtained coagulated particles are shown in Table 1.

TABLE 1

| | Example 1 | Example 2 | Example 3 | Example 4 | Example 5 | Example 6 | Example 7 | Example 8 | Example 9 | Comparative Example 1 | Comparative Example 2 |
|---|---|---|---|---|---|---|---|---|---|---|---|
| Thickener | Polyethylene oxide (PEO-8Z) | Polyethylene oxide (PEO-8Z) | Polyethylene oxide (PEO-8Z) | Polyethylene oxide (PEO-8Z) | Polyethylene oxide (PEO-8Z) | Polyethylene oxide (PEO-3Z) | Polyethylene oxide (PEO-18Z) | Methyl cellulose (MC60SH-50) | Polyethylene oxide (PEO-3Z) | — | — |
| Viscosity average molecular weight | 1,700,000 to 2,200,000 | 1,700,000 to 2,200,000 | 1,700,000 to 2,200,000 | 1,700,000 to 2,200,000 | 1,700,000 to 2,200,000 | 600,000 to 1,100,000 | 4,300,000 to 4,800,000 | — | 600,000 to 1,100,000 | — | — |
| Add amount of thickener per 100 parts of polymer solid content of latex prepared by emulsion polymerization (part) | 0.05 | 0.05 | 0.05 | 0.05 | 0.05 | 0.1 | 0.025 | 0.05 | 0.05 | 0 | 0 |
| Viscosity of latex prepared by emulsion polymerization containing thickener at 25° C. (mPa·s) | 23 | 23 | 23 | 23 | 23 | 18 | 27 | 19 | 23 | 7 | 7 |
| Dipping nozzle | Circular tube type dipping nozzle having inner diameter of 3 mm | Circular tube type dipping nozzle having inner diameter of 5 mm | Flat type dipping nozzle having longer diameter of 10 mm and shorter diameter of 3 mm | Flat type dipping nozzle having longer diameter of 10 mm and shorter diameter of 3 mm | Flat type dipping nozzle having longer diameter of 10 mm and shorter diameter of 3 mm | Flat type dipping nozzle having longer diameter of 10 mm and shorter diameter of 3 mm | Flat type dipping nozzle having longer diameter of 10 mm and shorter diameter of 3 mm | Flat type dipping nozzle having longer diameter of 10 mm and shorter diameter of 3 mm | Circular tube type dipping nozzle having inner diameter of 8 mm | Flat type dipping nozzle having longer diameter of 10 mm and shorter diameter of 3 mm | Circular tube type dipping nozzle having inner diameter of 8 mm |
| Cross sectional area of dipping nozzle (mm²) | 7.1 | 19.6 | 28.1 | 28.1 | 28.1 | 28.1 | 28.1 | 28.1 | 50.3 | 28.1 | 50.3 |
| Angle between direction of discharging latex preprepd by emulsion polymerization and direction of flow of solution containing coagualting agent | 30° | 30° | 30° | 30° | 30° | 30° | 30° | 30° | 30° | 30° | 30° |
| Linear velocity of latex (m/s) | 1.0 | 1.0 | 1.0 | 0.7 | 1.5 | 1.0 | 1.0 | 1.0 | 1.0 | 1.0 | 1.0 |
| Particle diameter distribution after dry >1000 μm (volume cumulative frequency: unit %) | 0.7 | 0.4 | 0.8 | 0.6 | 0.7 | 0.8 | 1.8 | 0.6 | 0.9 | 0.8 | 0 |
| Particle diameter distribution after dry ≤50 μm (volume cumulative frequency: unit %) | 2.2 | 4.9 | 2.8 | 1.7 | 3.4 | 1.9 | 1.4 | 4.2 | 8.4 | 10.2 | 19.1 |
| Bulk specific gravity (g/cm³) | 0.45 | 0.39 | 0.44 | 0.44 | 0.41 | 0.43 | 0.45 | 0.43 | 0.36 | 0.34 | 0.31 |

EXPLANATION OF REFERENCES

11: Latex containing polyethylene oxide
12: Coagulating agent
13: Dipping nozzle
14: Putting-out opening
15: Crushing pump
1: Casing body
2: Rotating axis
3: Impeller
4: Suction passage
5: Crushing impeller
6: Intermediate case
7: Graded fixed blade

The invention claimed is:

1. A method for manufacturing coagulated particles from a latex prepared by emulsion polymerization, the method comprising:
discharging the latex prepared by emulsion polymerization containing a thickener into a solution containing a coagulating agent, thereby coagulating the latex prepared by emulsion polymerization to form coagulated aggregates having an average size of from 0.1 to 5 cm$^3$ in the solution containing a coagulating agent, and
crushing the coagulated aggregates to obtain the coagulated particles,
wherein the latex includes an amount of the thickener from 0.01 to 3.0 parts by weight, per 100 parts by weight of a polymer solid content of the latex prepared by emulsion polymerization, and
wherein the thickener is a nonionic water-soluble polymer.

2. The method according to claim 1, wherein the latex prepared by emulsion polymerization has a viscosity of at least 10 mPa·s at 25° C.

3. The method according to claim 1, wherein the latex prepared by emulsion polymerization is discharged from a nozzle into the solution containing a coagulating agent, and a nozzle outlet of the nozzle has a length of 2 mm or less from an inner circumference to a center part in cross sections thereof.

4. The method according to claim 3, wherein the nozzle is a circular tube having an inner diameter of from 1 mm to 4 mm at a nozzle outlet, or a nozzle having a flat nozzle outlet with a longer diameter of from 4 mm to 300 mm and a shorter diameter of from 1 mm to 4 mm.

5. The method according to claim 3, wherein the latex prepared by emulsion polymerization discharged from the nozzle is moved away from the nozzle outlet to coagulate the latex in the solution containing a coagulating agent.

6. The method according to claim 3, further comprising making a flow in the solution containing a coagulating agent, and coagulating the latex prepared by emulsion polymerization in the solution containing a coagulating agent, to prepare coagulated particles in an anisotropic shape, under conditions that the nozzle outlet for discharging the latex prepared by emulsion polymerization is directed to a direction in the range of ±90° relative to a direction of the flow, and the latex prepared by emulsion polymerization is discharged from the nozzle outlet at a linear velocity of from 0.3 to 2 m/s.

7. The method according to claim 1, wherein a polymer in the latex prepared by emulsion polymerization has a volume average particle diameter of from 0.05 to 0.5 μm.

8. The method according to claim 1, wherein the latex prepared by emulsion polymerization has a polymer solid content of from 10 to 40% by weight.

9. The method according to claim 1, wherein the thickener has a viscous average molecular weight of from 600,000 to 8,000,000.

10. The method according to claim 1, wherein the coagulating agent is at least one substance selected from the group consisting of a monovalent inorganic acid, a salt of a monovalent inorganic acid, a divalent inorganic acid, a salt of a divalent inorganic acid, a trivalent inorganic acid, and a salt of a trivalent inorganic salt.

11. The method according to claim 1, wherein the thickener is at least one compound selected from the group consisting of polyalkylene oxide, polyvinyl alcohol, methyl cellulose, hydroxyethyl methyl cellulose, hydroxylethyl cellulose, hydroxypropyl methylcellulose, sodium polyacrylate, polyvinyl pyrrolidone, polyacrylamide, and polydimethylaminoethyl methacrylate.

12. The method according to claim 1, wherein the latex prepared by emulsion polymerization is obtained by polymerizing from 50 to 100% by weight of butadiene, from 0 to 40% by weight of an aromatic vinyl monomer, from 0 to 10% by weight of a vinyl monomer copolymerizable with butadiene and the aromatic vinyl monomer, and from 0 to 5% by weight of a multifunctional monomer to form a rubber latex having a glass transition temperature of 0° C. or less, and then graft-polymerizing from 50 to 95 parts by weight of solid content of the rubber latex with from 5 to 50 parts by weight of a monomer mixture comprising from 10 to 100% by weight of a methacrylic acid ester, from 0 to 90% by weight of an aromatic vinyl monomer, from 0 to 25% by weight of a vinyl cyanide monomer, and from 0 to 20% by weight of a vinyl monomer copolymerizable with the methacrylic acid ester, the aromatic vinyl monomer and the vinyl cyanide monomer.

13. The method according to claim 1, wherein the latex prepared by emulsion polymerization comprising the thickener is formed into flocculated substances of the latex prepared by emulsion polymerization.

14. A method for manufacturing coagulated particles from a latex prepared by emulsion polymerization, the method comprising:
discharging the latex prepared by emulsion polymerization having a viscosity of at least 10 mPa·s at 25° C. into a solution comprising a coagulating agent, thereby coagulating the latex prepared by emulsion polymerization to form coagulated aggregates having an average size of from 0.1 to 5 cm' in the solution containing a coagulating agent, and
crushing the coagulated aggregates to obtain the coagulated particles,
wherein the latex includes an amount of a thickener from 0.01 to 3.0 parts by weight, per 100 parts by weight of a polymer solid content of the latex prepared by emulsion polymerization, and
wherein the thickener is a nonionic water-soluble polymer.

15. The method according to claim 14, wherein the latex prepared by emulsion polymerization is discharged from a nozzle into the solution containing a coagulating agent, and a nozzle outlet of the nozzle has a length of 2 mm or less from an inner circumference to a center part in cross sections thereof.

16. The method according to claim 15, further comprising making a flow in the solution containing a coagulating agent, and coagulating the latex prepared by emulsion polymerization in the solution containing a coagulating agent, to prepare coagulated particles in an anisotropic shape, under conditions that the nozzle outlet for discharging the latex prepared by emulsion polymerization is directed to a direction in a range of ±90° relative to a direction of the flow, and the latex prepared by emulsion polymerization is discharged from the nozzle outlet at a linear velocity of 0.3 to 2 m/s.

17. The method according to claim 14, wherein the latex prepared by emulsion polymerization having a viscosity of at least 10 mPa·s at 25° C. is formed into flocculated substances of the latex prepared by emulsion polymerization.

18. Aggregates having an anisotropic shape obtained by discharging a latex prepared by emulsion polymerization comprising a thickener into a solution comprising a coagulating agent,
wherein the aggregates have an average size of from 0.01 to 100 cm$^3$.

19. The aggregates of claim 18, wherein the coagulated aggregates have an average size of from 0.1 to 5 cm$^3$.

20. A method for manufacturing coagulated particles from a latex prepared by emulsion polymerization, the method comprising:
crushing the coagulated aggregates in the solution comprising a coagulating agent obtained by the method of claim 1; and
maintaining a resultant mixture at 60 to 100° C. for 1 to 60 minutes, thereby obtaining the coagulated particles.

21. Coagulated particles from a latex prepared by emulsion polymerization obtained by the method of claim 20, wherein the coagulated particles have a bulk specific gravity of 0.35 g/cm$^3$ or more, a volume cumulative frequency of particles having a diameter of 50 μm or less is 10% or less, and a volume cumulative frequency of particles having a diameter of more than 1000 μm is 2.0% or less in a distribution of a volume particle diameter.

* * * * *